(12) United States Patent
Reston et al.

(10) Patent No.: US 10,992,593 B2
(45) Date of Patent: *Apr. 27, 2021

(54) PERSISTENT INTEGRATION PLATFORM FOR MULTI-CHANNEL RESOURCE TRANSFERS

(71) Applicant: Bank of America Corporation, Charlotte, NC (US)

(72) Inventors: Brent David Reston, Tiburon, CA (US); Margaret Winston, San Francisco, CA (US); Kevin Clark May, Waxhaw, NC (US); Jeremiah Fairbairn Williams, Fort Mill, SC (US); Ryan Michael Furey, Charlotte, NC (US); Michelle Nanette Downie, Weddington, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 11 days.

This patent is subject to a terminal disclaimer.

(21) Appl. No.: 16/153,317

(22) Filed: Oct. 5, 2018

(65) Prior Publication Data

US 2019/0140970 A1    May 9, 2019

Related U.S. Application Data

(60) Provisional application No. 62/569,027, filed on Oct. 6, 2017.

(51) Int. Cl.
*H04L 29/08* (2006.01)
*G06Q 30/02* (2012.01)
(Continued)

(52) U.S. Cl.
CPC .............. *H04L 47/70* (2013.01); *G06F 9/547* (2013.01); *G06N 5/02* (2013.01); *G06Q 30/0207* (2013.01);
(Continued)

(58) Field of Classification Search
CPC ....... G06Q 40/02–025; G06Q 30/0261; G06Q 30/0259; H04L 57/30–306;
(Continued)

(56) References Cited

U.S. PATENT DOCUMENTS 5,928,363 A * 7/1999 Ruvolo .................. G06F 21/31
                                                      713/155
6,256,498 B1 * 7/2001 Ludwig .................... H04B 7/26
                                                      455/433

(Continued)

*Primary Examiner* — Emmanuel L Moise
*Assistant Examiner* — Julian Chang
(74) *Attorney, Agent, or Firm* — Michael A. Springs; Moore & Van Allen PLLC; Seongun M. Hong

(57) ABSTRACT

Embodiments of the present invention provide a persistent integration platform for conducting a multichannel resource transfer. In particular, the system may utilize a multi-step and multilayered authentication process across multiple disparate computing systems to complete the resource transfer process. In some embodiments, the system may utilize a persistent element which may be accessed by the user across multiple devices which aids in the resource transfer. For instance, the resource transfer process may be started on a first computing system, which may be a stationary networked terminal. At this point, a record of the resource transfer may be created within the persistent element. The user may thereafter access the persistent element through a second computing system, such as a user device, to resume the resource transfer and complete the remaining steps as necessary.

20 Claims, 10 Drawing Sheets

(51) Int. Cl.
  *H04L 12/911*  (2013.01)
  *G06N 5/02*  (2006.01)
  *G06F 9/54*  (2006.01)
  *G06Q 40/00*  (2012.01)
  *G06F 16/27*  (2019.01)
  *H04L 29/06*  (2006.01)

(52) U.S. Cl.
  CPC .............. *H04L 67/10* (2013.01); *H04L 67/14* (2013.01); *G06F 16/27* (2019.01); *G06Q 40/00* (2013.01); *H04L 47/741* (2013.01); *H04L 63/08* (2013.01); *H04L 67/02* (2013.01); *H04L 67/20* (2013.01)

(58) Field of Classification Search
  CPC ... H04L 67/02–42; H04L 63/08–0892; H04W 4/02; H04W 4/021; H04W 4/023; H04W 4/025; H04W 4/029; H04W 64/00; H04W 12/00503
  See application file for complete search history.

(56) References Cited

U.S. PATENT DOCUMENTS

| | | | |
|---|---|---|---|
| 6,324,524 B1 * | 11/2001 | Lent | G06Q 20/10 705/14.39 |
| 6,405,181 B2 * | 6/2002 | Lent | G06Q 30/06 705/38 |
| 6,442,748 B1 | 8/2002 | Bowman-Amuah | |
| 7,068,680 B1 | 6/2006 | Kaltenmark et al. | |
| 7,143,063 B2 * | 11/2006 | Lent | G06Q 20/10 705/38 |
| 7,174,534 B2 | 2/2007 | Chong et al. | |
| 7,207,041 B2 | 4/2007 | Elson et al. | |
| 7,505,939 B2 * | 3/2009 | Lent | G06Q 20/10 705/35 |
| 7,693,976 B2 | 4/2010 | Perry et al. | |
| 7,725,559 B2 | 5/2010 | Landis et al. | |
| 7,756,781 B2 * | 7/2010 | Lent | G06Q 20/10 705/38 |
| 7,890,517 B2 | 2/2011 | Angelo et al. | |
| 8,145,516 B2 | 3/2012 | Blanchard et al. | |
| 9,032,498 B1 * | 5/2015 | Ben Ayed | H04W 12/0608 726/9 |
| 9,363,221 B1 * | 6/2016 | Ozog | G06F 16/24578 |
| 9,509,676 B1 * | 11/2016 | Johnson | G06F 21/35 |
| 9,603,019 B1 * | 3/2017 | Ramatchandirane | G06Q 20/401 |
| 9,825,959 B2 * | 11/2017 | Blitzstein | H04L 63/102 |
| 9,898,880 B2 * | 2/2018 | Nagisetty | G07C 9/28 |
| 9,911,158 B1 * | 3/2018 | Bueche, Jr. | G06F 21/445 |
| 10,219,122 B1 * | 2/2019 | Scanlon | H04L 51/20 |
| 10,231,128 B1 * | 3/2019 | Ziraknejad | H04L 63/0428 |
| 10,332,110 B2 * | 6/2019 | Patel | H04L 63/0853 |
| 10,492,039 B1 * | 11/2019 | Scanlon | H04L 51/38 |
| 10,701,067 B1 * | 6/2020 | Ziraknejad | G06F 21/6209 |
| 10,771,458 B1 * | 9/2020 | Xia | H04W 4/02 |
| 10,789,641 B2 * | 9/2020 | Roselli | G06Q 40/02 |
| 10,855,664 B1 * | 12/2020 | Ziraknejad | H04W 76/10 |
| 2003/0083906 A1 | 5/2003 | Howell | G06Q 40/02 705/4 |
| 2005/0015430 A1 | 1/2005 | Rothman et al. | |
| 2005/0066037 A1 * | 3/2005 | Song | G06F 16/95 709/227 |
| 2006/0195476 A1 | 8/2006 | Nori et al. | |
| 2006/0272028 A1 | 11/2006 | Maes et al. | |
| 2007/0050449 A1 * | 3/2007 | Beck | H04L 67/142 709/204 |
| 2007/0192763 A1 * | 8/2007 | Helvick | G06F 8/65 717/168 |
| 2008/0070588 A1 * | 3/2008 | Morin | H04W 4/027 455/456.1 |
| 2008/0248788 A1 | 10/2008 | Smith et al. | |
| 2008/0270295 A1 * | 10/2008 | Lent | G06Q 30/06 705/38 |
| 2009/0018996 A1 | 1/2009 | Hunt et al. | |
| 2009/0182630 A1 * | 7/2009 | Otto | G06Q 20/20 705/14.1 |
| 2009/0292677 A1 * | 11/2009 | Kim | G06F 16/958 |
| 2010/0185871 A1 * | 7/2010 | Scherrer | G06F 21/6218 713/186 |
| 2010/0306363 A1 * | 12/2010 | Saputra | H04L 67/142 709/224 |
| 2011/0197163 A1 * | 8/2011 | Jegal | G06F 3/0482 715/811 |
| 2011/0314124 A1 * | 12/2011 | Gimson | H04L 67/02 709/217 |
| 2012/0136998 A1 * | 5/2012 | Hough | H04W 4/021 709/225 |
| 2012/0198019 A1 * | 8/2012 | Thomas | G06F 16/972 709/217 |
| 2012/0215682 A1 * | 8/2012 | Lent | G06Q 40/08 705/38 |
| 2013/0065585 A1 * | 3/2013 | Pelletier | H04W 76/14 455/435.1 |
| 2013/0074067 A1 * | 3/2013 | Chowdhry | G06F 21/74 718/1 |
| 2013/0080642 A1 | 3/2013 | Adam et al. | |
| 2013/0138791 A1 * | 5/2013 | Thomas | H04L 67/148 709/223 |
| 2013/0267253 A1 * | 10/2013 | Case | H04W 4/021 455/456.3 |
| 2013/0268357 A1 | 10/2013 | Heath | |
| 2013/0275220 A1 * | 10/2013 | Bonk | G06Q 30/0261 705/14.58 |
| 2013/0326137 A1 * | 12/2013 | Bilange | H04L 67/289 711/113 |
| 2013/0332343 A1 | 12/2013 | Desai et al. | |
| 2014/0012806 A1 * | 1/2014 | Ching | H04W 4/029 707/609 |
| 2014/0025770 A1 | 1/2014 | Warfield et al. | |
| 2014/0273963 A1 * | 9/2014 | Su | H04W 12/0804 455/411 |
| 2014/0280595 A1 | 9/2014 | Mani et al. | |
| 2014/0282877 A1 * | 9/2014 | Mahaffey | H04W 12/08 726/3 |
| 2014/0351175 A1 * | 11/2014 | Venkat | G16H 40/20 706/11 |
| 2014/0365570 A1 * | 12/2014 | Peters | H04L 67/26 709/204 |
| 2015/0013016 A1 * | 1/2015 | Kanter | G06F 21/6245 726/28 |
| 2015/0135206 A1 | 5/2015 | Reisman | |
| 2015/0163206 A1 | 6/2015 | McCarthy et al. | |
| 2015/0242255 A1 * | 8/2015 | Lesandro | G06F 16/2455 719/314 |
| 2015/0278810 A1 * | 10/2015 | Ramatchandirane | G06Q 20/30 705/16 |
| 2015/0310188 A1 | 10/2015 | Ford et al. | |
| 2016/0014112 A1 * | 1/2016 | Gunning | H04L 63/083 713/159 |
| 2016/0027055 A1 * | 1/2016 | Dixon | G06Q 30/0261 705/14.58 |
| 2016/0189283 A1 * | 6/2016 | Agrawal | G06Q 30/0635 705/7.21 |
| 2016/0267540 A1 * | 9/2016 | Garcia | H04W 4/60 |
| 2016/0277537 A1 * | 9/2016 | Liang | H04L 67/34 |
| 2016/0314439 A1 * | 10/2016 | Pinkerton | H04W 4/029 |
| 2016/0337863 A1 * | 11/2016 | Robinson | H04W 4/021 |
| 2017/0116168 A1 * | 4/2017 | Breslav | G06F 17/243 |
| 2017/0228785 A1 * | 8/2017 | Evje | G06Q 30/0261 |
| 2017/0302641 A1 * | 10/2017 | Ramatchandirane | H04L 63/0421 |
| 2017/0372055 A1 * | 12/2017 | Robinson | H04L 63/0853 |
| 2018/0060954 A1 * | 3/2018 | Yin | H04L 63/08 |
| 2018/0083961 A1 * | 3/2018 | Lewis | G06F 21/44 |
| 2018/0213361 A1 * | 7/2018 | Venkat | H04L 67/14 |
| 2018/0240187 A1 * | 8/2018 | Lee | G06Q 10/1095 |
| 2018/0276674 A1 * | 9/2018 | Ramatchandirane | G06F 21/335 |

(56) References Cited

U.S. PATENT DOCUMENTS

| | | | | |
|---|---|---|---|---|
| 2018/0288168 A1* | 10/2018 | Sharifi | .............. | H04M 1/72522 |
| 2018/0288617 A1* | 10/2018 | Robison | .................. | H04L 67/12 |
| 2018/0357728 A1* | 12/2018 | Huening | ................ | G06Q 50/01 |
| 2018/0367542 A1* | 12/2018 | Wolf | ........................ | H04L 63/08 |
| 2018/0374164 A1* | 12/2018 | Ozog | ................. | G06Q 30/0269 |
| 2019/0065851 A1* | 2/2019 | Cardis | ................ | H04N 5/23222 |
| 2019/0087760 A1* | 3/2019 | Appel | ................ | G06Q 10/0637 |
| 2019/0286806 A1* | 9/2019 | Robinson | .............. | H04W 12/06 |

* cited by examiner

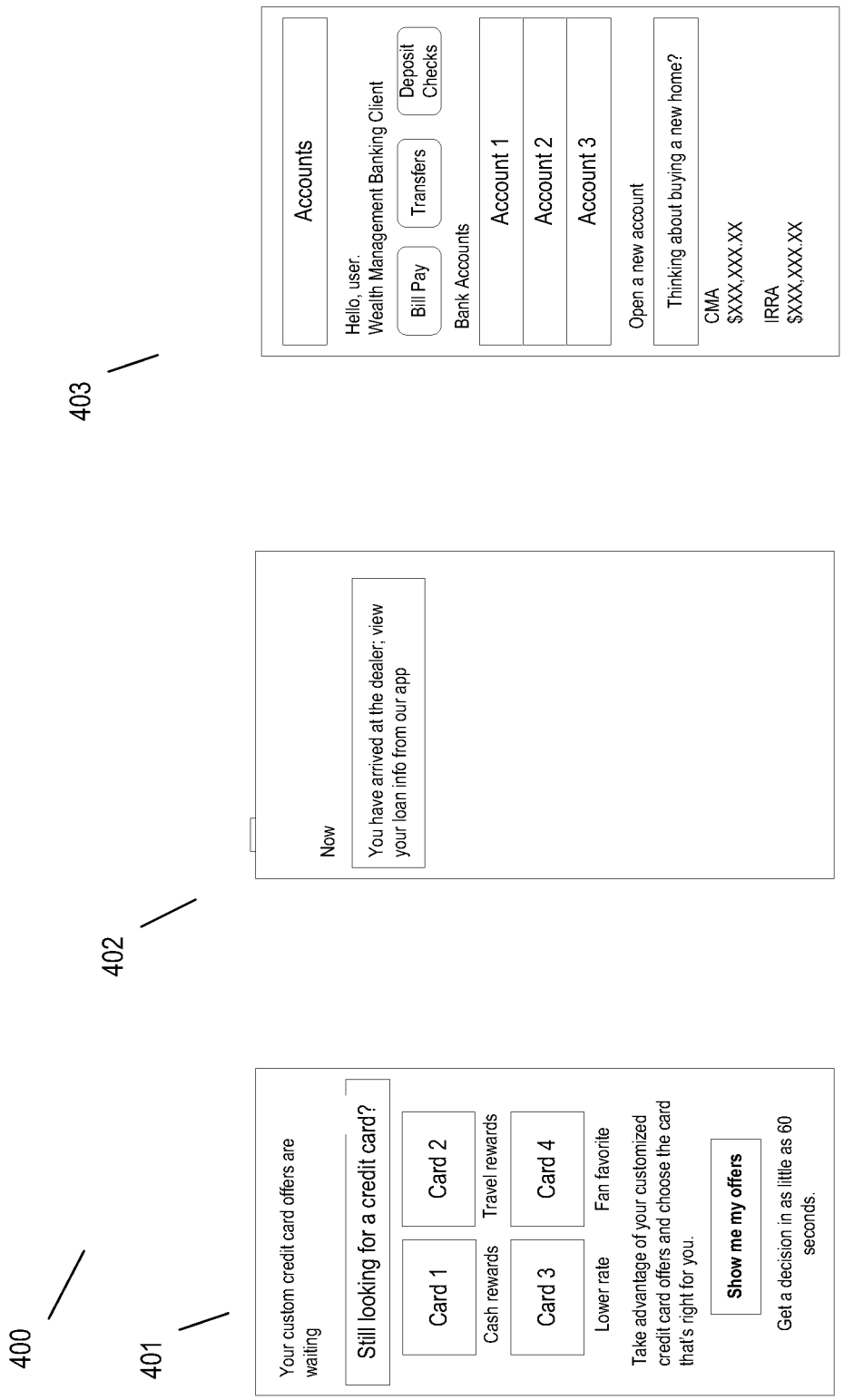

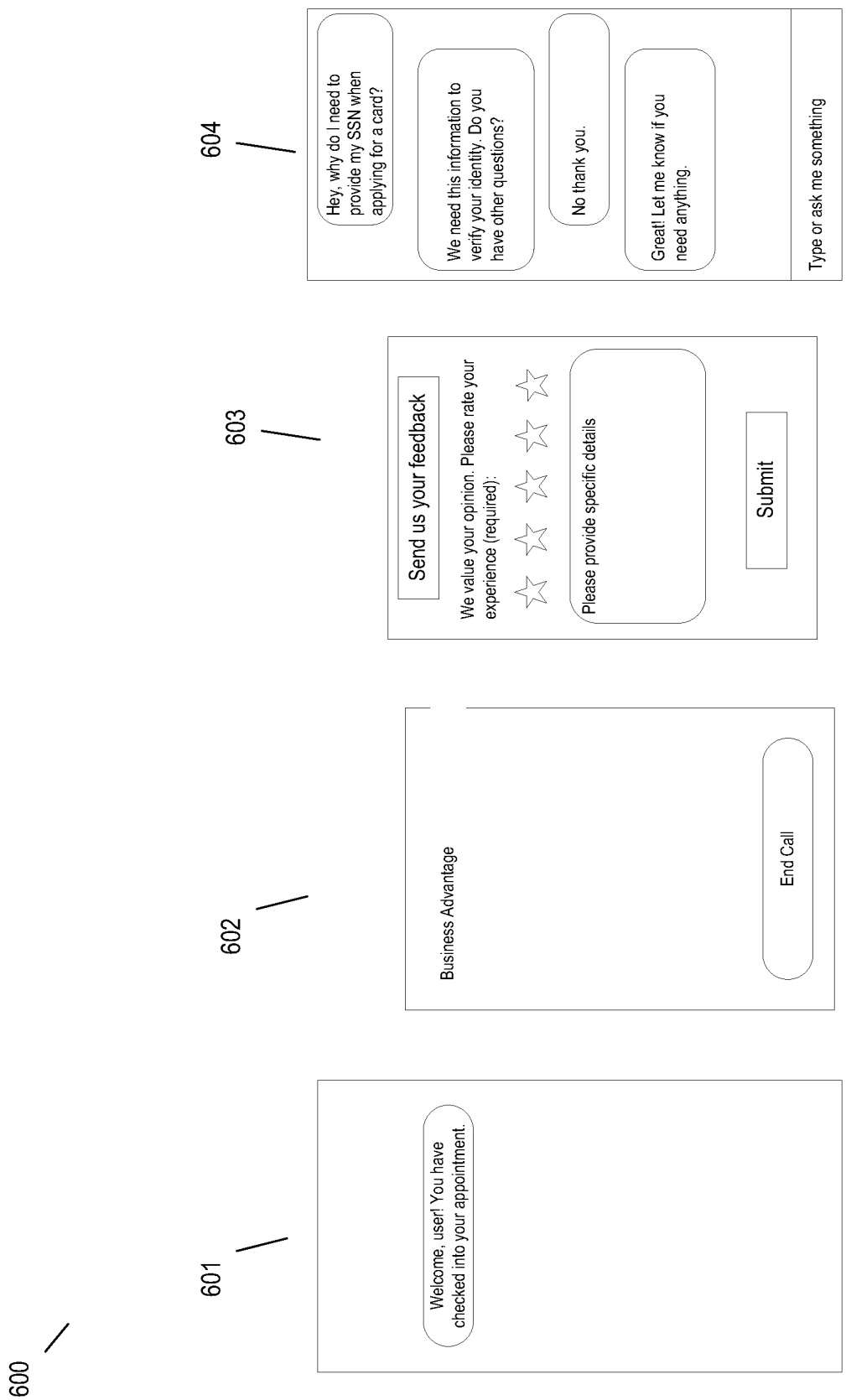

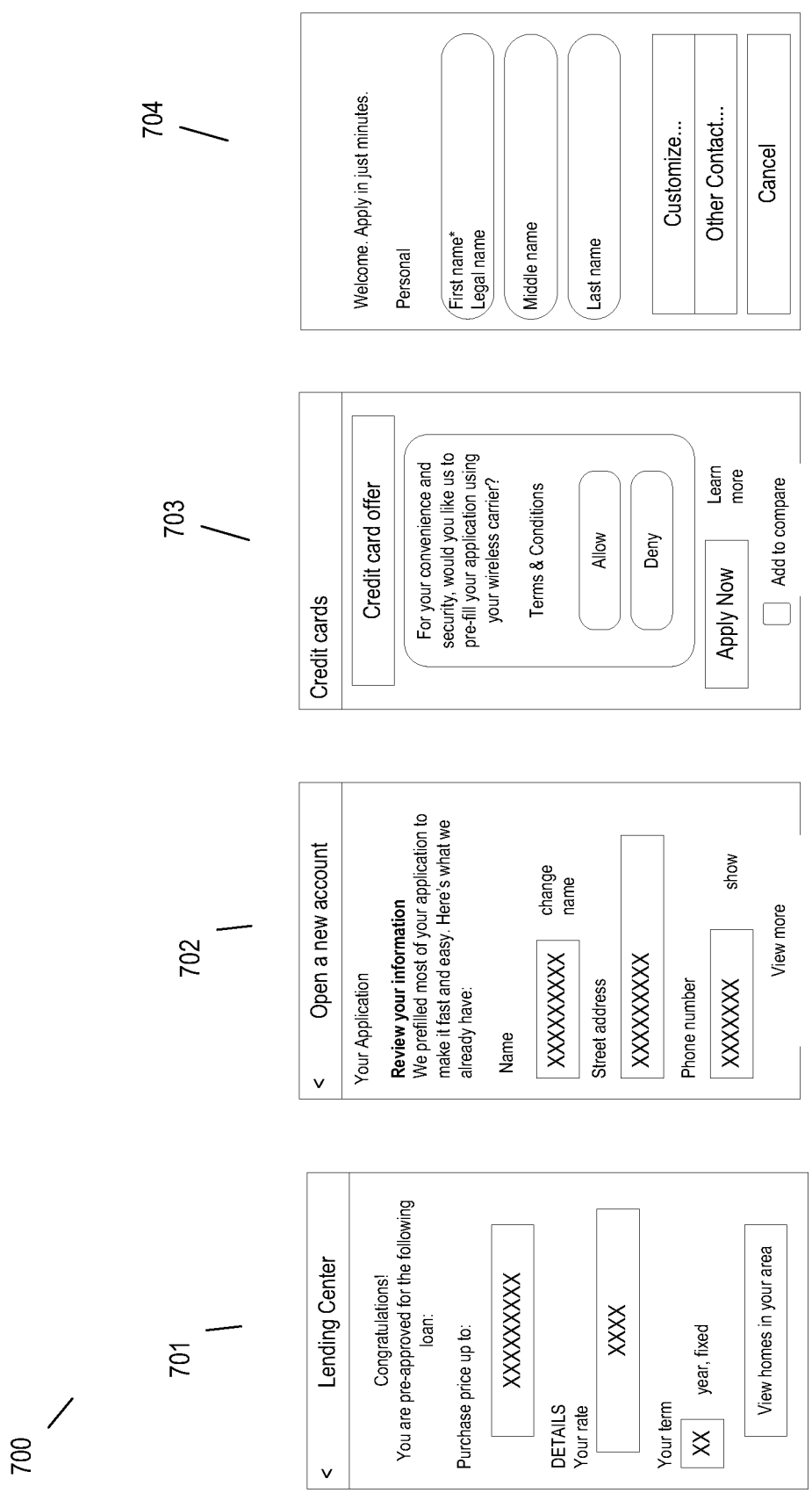

FIG. 8A

Additional income
Do you have any additional income from other sources?

☐ Yes, I have additional income I would like to include in this application.

Adding a co-applicant?

☐ Yes, add a co-applicant

[ Continue ]

[ Save for Later ]

Cancel and exit application

FIG. 8B

Saved your application

Thanks for considering X for your financial needs. Your information for a home equity line of credit has been saved so completing your application later will be quick and easy.

You can pick up where you left off and complete your application at any time between now and X. If you're already enrolled in online banking, you can access your saved application in the Open an Account section after you sign in.

[ Complete your application ]

900

901

Congratulations, you're approved.
Thanks for being our customer. Your application reference number is:

| Status: Approved |
| Credit limit: XXXXX |

What happens next?
You'll receive your card in the mail in 7-10 business days.

☑ Enroll in online & mobile banking

Create online ID of your choice:
[**********]

Create a password of your choice:
[**********]

We found the following bills. Select the bills you would like to add:

☐ Select all

| Third party #1 |
| Third party #2 |
| Third party #3 |
| Third party #4 |

Back        Add Billers

Your card details

| Credit card #1 |

Below is your credit card information
To start using your card now, write down your account information. For security, keep this information in a secure place.

Account Number
XXXXXXXXXXXXXXXX

Expiration date
XX/XX/XXXX

CVV
XXX

Add to digital wallet

FIG. 9C

PERSISTENT INTEGRATION PLATFORM FOR MULTI-CHANNEL RESOURCE TRANSFERS

CROSS-REFERENCE TO RELATED APPLICATIONS

The present application claims priority to U.S. Provisional Patent Application Ser. No. 62/569,027, filed Oct. 6, 2017 of the same title, the entirety of which is hereby incorporated by reference.

FIELD OF THE INVENTION

The present invention embraces a system, computer program product, and method for conducting a multichannel resource transfer.

BACKGROUND

Traditional resource transfers are typically completed in a single, uninterrupted session. In such scenarios, a user who begins a resource transfer process but wishes to suspend the process must later repeat one or more steps in the resource transfer process in order to achieve completion. Accordingly, there is a need for an efficient system that minimizes the need to repeat steps when resuming a resource transfer process.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present invention provides a persistent integration platform which stores user data on resource transfers. The data may include the status of a resource transfer as well as the steps that have been completed by the user to complete the resource transfer. The integration platform may be accessed by a number of different types of authorized devices, which greatly increases the flexibility and the efficiency of the resource transfer system. Furthermore, the system may typically require the user to authenticate one or more times per device that is used to complete one or more steps of the resource transfer process. This in turn increases the security of the system and also increases the confidence level to which the system has correctly identified the user.

Accordingly, embodiments of the present disclosure provide a system for a persistent integration platform for multi-channel resource transfers. The system may comprise a communication interface; a processor; and a memory having executable code stored thereon. The executable code, when executed by the processor, may cause the processor to detect that a user has accessed an entity computing system; authenticate the user via the entity computing system; retrieve, from a resource transfer server, data associated with the user; based on the data associated with the user, prompt the user to initiate a resource transfer process; detect that the user wishes to suspend the resource transfer process; generate a data record of the resource transfer process within a persistent element of the resource transfer server; detect that the user wishes to resume the resource transfer process via a user computing system; and authenticate the user via the user computing system.

In some embodiments, the executable code further causes the processor to receive a request from the user to initiate a second resource transfer process; and generate a second data record of the second resource transfer process within the persistent element.

In some embodiments, the executable code further causes the processor to receive a request from the user to access an artificial intelligence bot stored on the resource transfer server, wherein the request comprises an inquiry from the user; and based on the inquiry from the user and the data associated with the user, transmit a recommendation to the user.

In some embodiments, the executable code further causes the processor to detect, from a mobile device associated with the user, a location of the user; and based on the location of the user and historical data associated with the user, prompt the user to initiate a second resource transfer process.

In some embodiments, the executable code further causes the processor to detect that the data record of the resource transfer process has remained within the persistent element for a threshold amount of time; and send a notification to the user, where the notification comprises a reminder to complete the resource transfer process.

In some embodiments, the executable code further causes the processor to detect that the resource transfer process requires personal information of the user; retrieve the personal information of the user from the data associated with the user; and using the personal information of the user, complete the resource transfer process.

In some embodiments, retrieving the personal information of the user comprises pulling the personal information from a third party database.

In some embodiments, retrieving the personal information of the user comprises pulling the personal information from the user computing system through an API.

In some embodiments, the executable code further causes the processor to receive, from the user, a request to import a third party account associated with the user; retrieve, from a third party server, third party account information associated with the user; and prompt the user to select the third party account for importing.

Embodiments of the present disclosure also provide a computer program product for a persistent integration platform for multi-channel resource transfers. The computer program product may comprise at least one non-transitory computer readable medium having computer-readable program code portions embodied therein, the computer-readable program code portions comprising an executable portion for detecting that a user has accessed an entity computing system; an executable portion for authenticating the user via the entity computing system; an executable portion for retrieving, from a resource transfer server, data associated with the user; an executable portion for, based on the data associated with the user, prompting the user to initiate a resource transfer process; an executable portion for detecting that the user wishes to suspend the resource transfer process; an executable portion for generating a data record of the resource transfer process within a persistent element of the resource transfer server; an executable portion for detecting that the user wishes to resume the resource transfer process via a user computing system; and an executable portion for authenticating the user via the user computing system.

In some embodiments, the computer-readable program code portions further comprise an executable portion for receiving a request from the user to initiate a second resource transfer process; and an executable portion for generating a second data record of the second resource transfer process within the persistent element.

Embodiments of the present disclosure also provide a computer-implemented method for a persistent integration platform for multi-channel resource transfers. The method may comprise detecting that a user has accessed an entity computing system; authenticating the user via the entity computing system; retrieving, from a resource transfer server, data associated with the user; based on the data associated with the user, prompting the user to initiate a resource transfer process; detecting that the user wishes to suspend the resource transfer process; generating a data record of the resource transfer process within a persistent element of the resource transfer server; detecting that the user wishes to resume the resource transfer process via a user computing system; and authenticating the user via the user computing system.

In some embodiments, the computer-implemented method further comprises receiving a request from the user to initiate a second resource transfer process; and generating a second data record of the second resource transfer process within the persistent element.

In some embodiments, the computer-implemented method further comprises receiving a request from the user to access an artificial intelligence bot stored on the resource transfer server, wherein the request comprises an inquiry from the user; and based on the inquiry from the user and the data associated with the user, transmitting a recommendation to the user.

In some embodiments, the computer-implemented method further comprises detecting, from a mobile device associated with the user, a location of the user; and based on the location of the user and historical data associated with the user, prompting the user to initiate a second resource transfer process.

In some embodiments, the computer-implemented method further comprises detecting that the data record of the resource transfer process has remained within the persistent element for a threshold amount of time; and sending a notification to the user, where the notification comprises a reminder to complete the resource transfer process.

In some embodiments, the computer-implemented method further comprises detecting that the resource transfer process requires personal information of the user; retrieving the personal information of the user from the data associated with the user; and using the personal information of the user, completing the resource transfer process.

In some embodiments, retrieving the personal information of the user comprises pulling the personal information from a third party database.

In some embodiments, retrieving the personal information of the user comprises pulling the personal information from the user computing system through an API.

In some embodiments, the computer-implemented method further comprises receiving, from the user, a request to import a third party account associated with the user; retrieving, from a third party server, third party account information associated with the user; and prompting the user to select the third party account for importing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
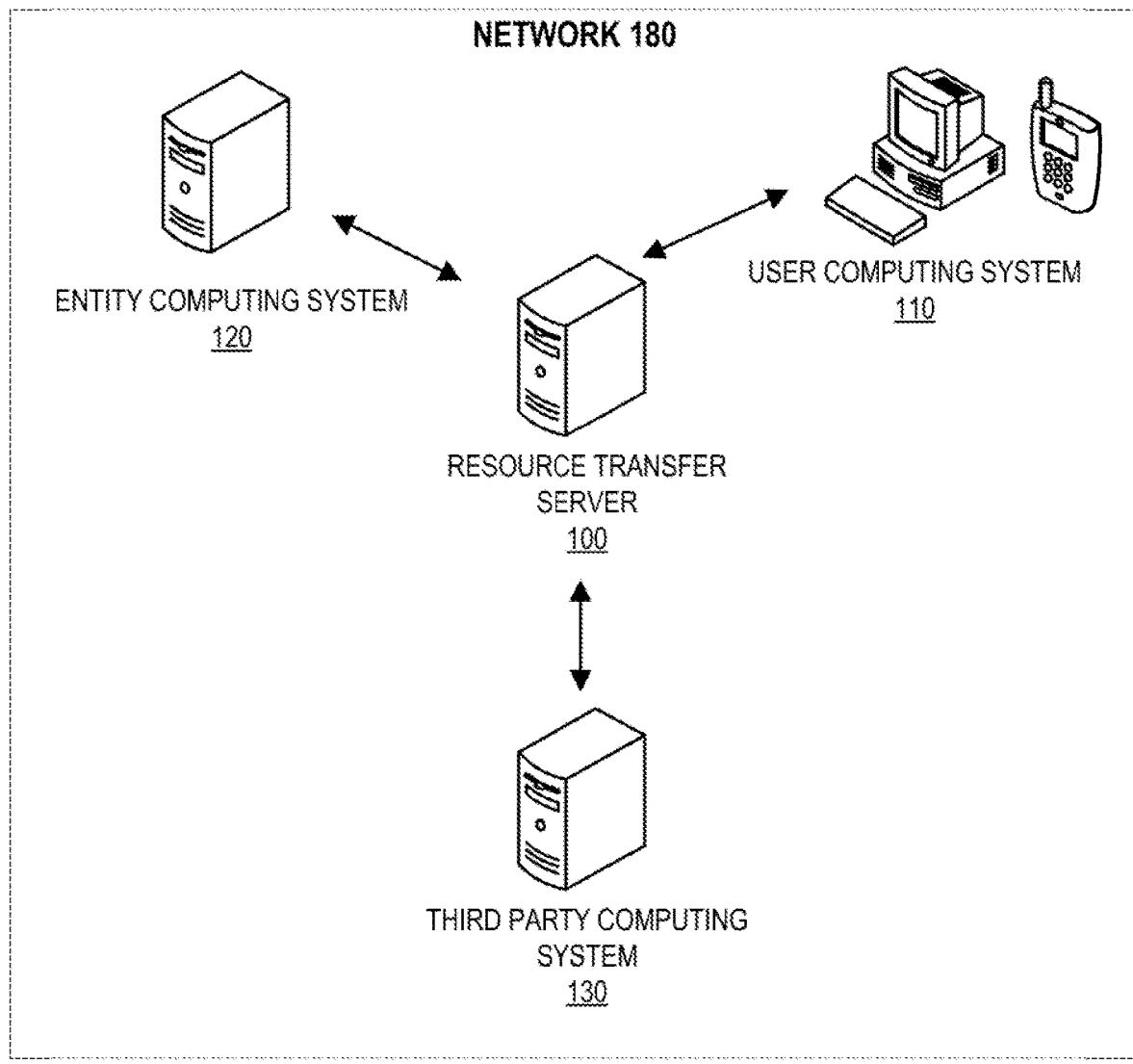
Figure 2:
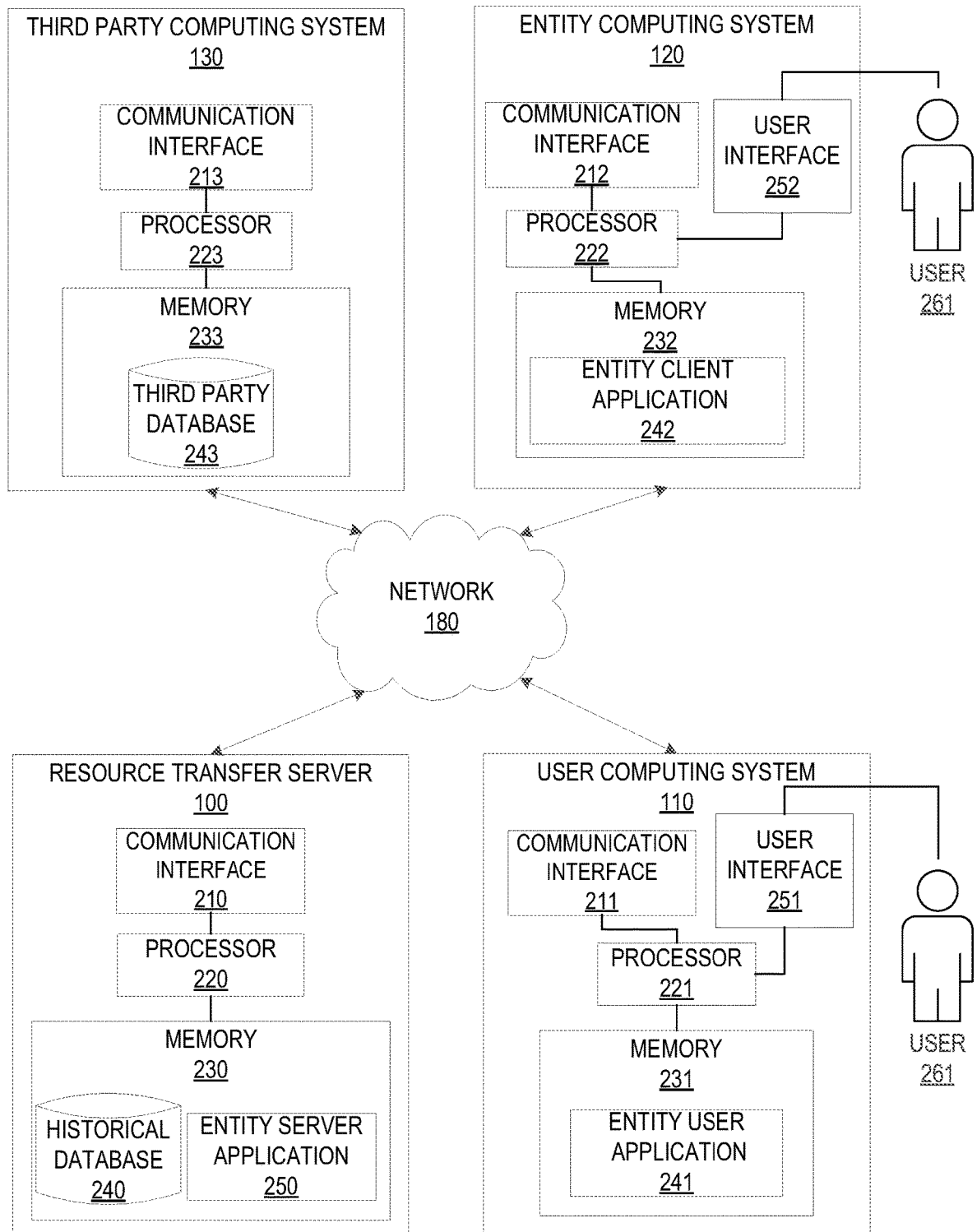
Figure 3:
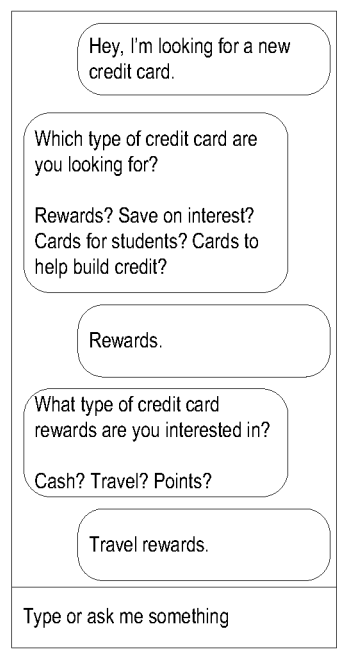
Figure 5A:
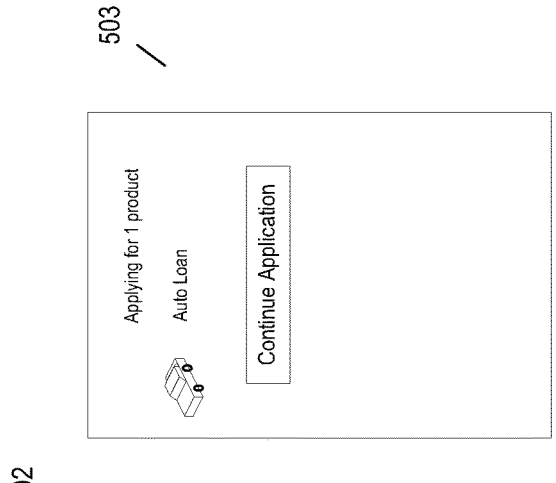
Figure 5B:
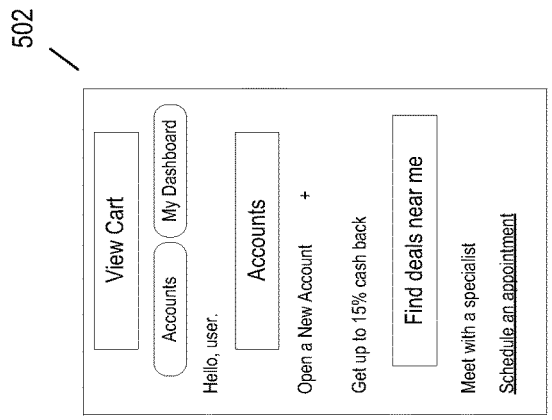
Figure 5C:
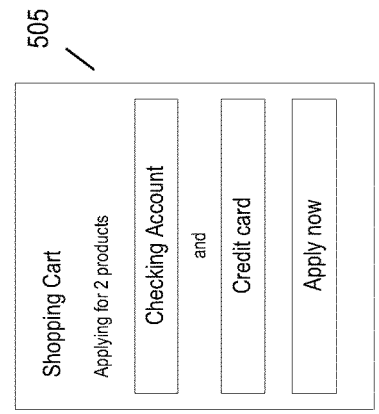
Figure 5D:
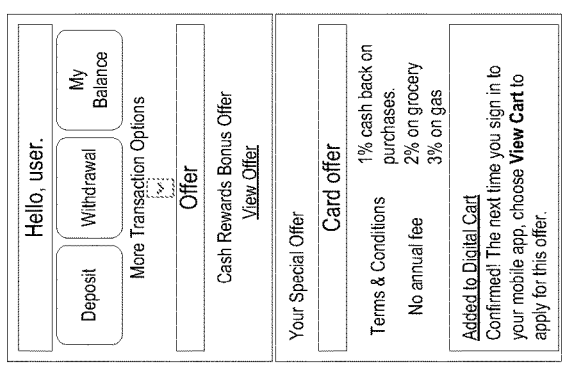
Figure 5E:
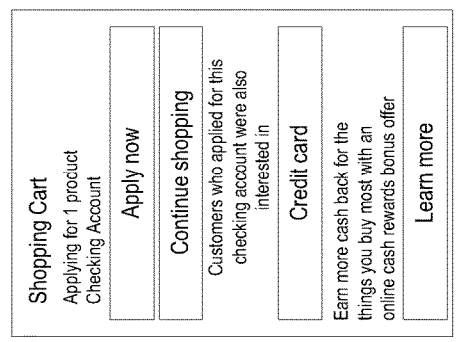
Figure 10:
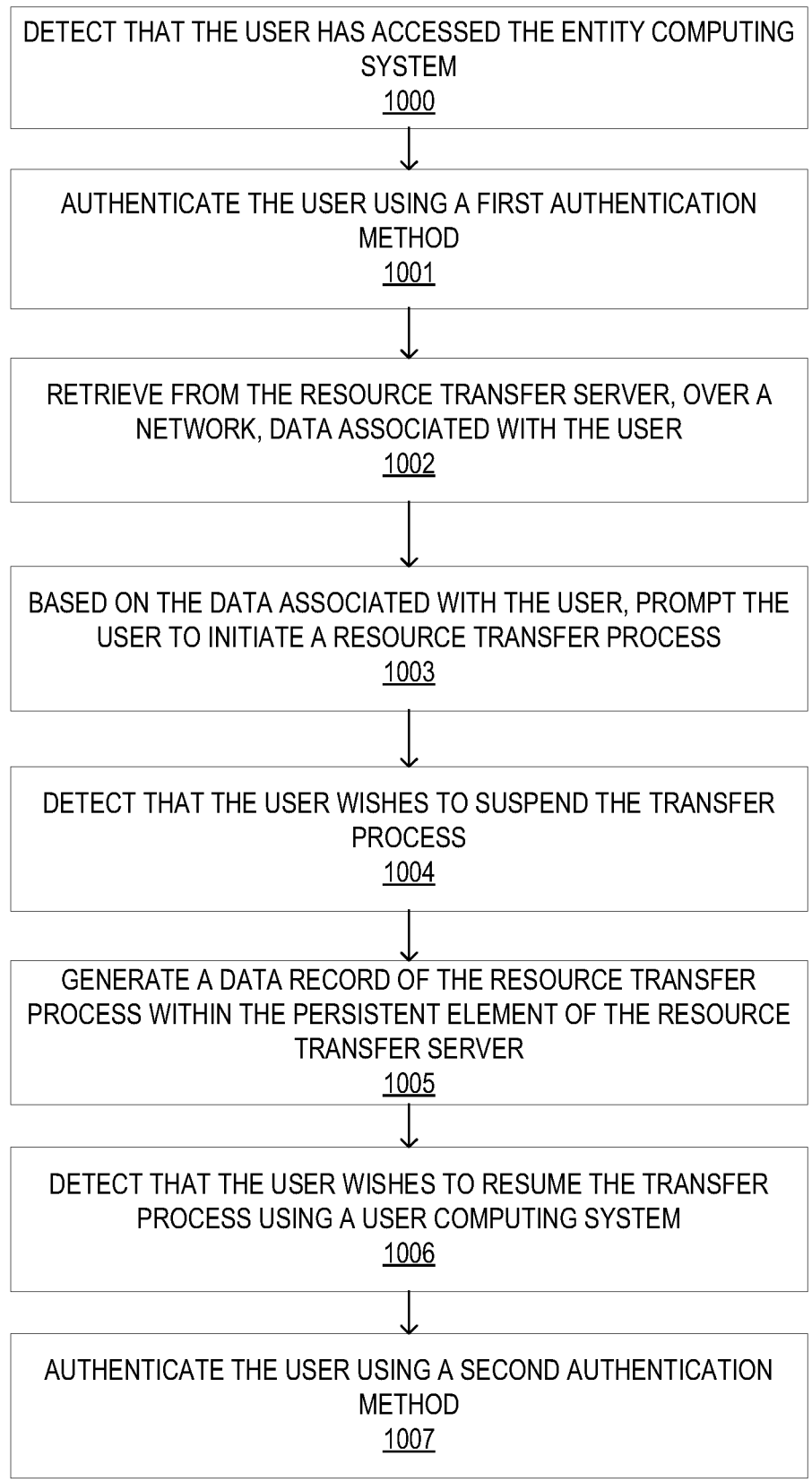

Having thus described embodiments of the invention in general terms, reference will now be made to the accompanying drawings, wherein:

FIG. 1 depicts an operating environment, in accordance with one embodiment of the present invention;

FIG. 2 depicts a block diagram illustrating the resource transfer server, the user computing system, the entity computing system, and the third party computing system in more detail, in accordance with one embodiment of the present invention;

FIG. 3 depicts an implementation of AI optimized discovery, in accordance with one embodiment of the present invention;

FIG. 4A depicts a graphical interface for an implementation of an events engine, in accordance with one embodiment of the present invention;

FIG. 4B depicts a graphical interface for an implementation of the signaling functions of the system, in accordance with one embodiment of the present invention;

FIG. 4C depicts a graphical interface for additional implementations of the signaling functions of the system, in accordance with one embodiment of the present invention;

FIG. 5A depicts a graphical interface with a link to allow the user to add an offer to the persistent digital cart, in accordance with one embodiment of the present invention;

FIG. 5B depicts a graphical interface for a persistent digital cart, in accordance with one embodiment of the present invention;

FIG. 5C depicts a graphical interface for pushing reminders and/or notifications to the user, in accordance with one embodiment of the present invention;

FIG. 5D depicts a graphical interface for the digital cart, in accordance with one embodiment of the present invention;

FIG. 5E depicts a graphical interface for the digital cart containing multiple items to be resolved by the user simultaneously, in accordance with one embodiment of the present invention;

FIG. 6A depicts a graphical interface for an implementation in which the system detects that the user has arrived at a particular location, in accordance with one embodiment of the present invention;

FIG. 6B depicts a graphical interface for pushing surveys to the user computing system, in accordance with one embodiment of the present invention;

FIG. 6C depicts a graphical interface for video conferencing, in accordance with one embodiment of the present invention;

FIG. 6D depicts a graphical interface for interacting with support AI, in accordance with one embodiment of the present invention;

FIG. 7A depicts a graphical interface for providing offers to the user, in accordance with one embodiment of the present invention;

FIG. 7B depicts a graphical interface for pre-filling applications, in accordance with one embodiment of the present invention;

FIG. 7C depicts a graphical interface for pulling user information from third party servers, in accordance with one embodiment of the present invention;

FIG. 7D depicts a graphical interface for pulling user information from the user computing system through an API, in accordance with one embodiment of the present invention;

FIG. 8A depicts a graphical interface for accessing an application stored within the persistent digital cart, in accordance with one embodiment of the present invention;

FIG. 8B depicts a graphical interface for sending push notifications to the user, in accordance with one embodiment of the present invention;

FIG. 9A depicts a graphical interface for digital enrollment of account management, in accordance with one embodiment of the present invention;

FIG. 9B depicts a graphical interface for importation of third party data to manage resource transfers, in accordance with one embodiment of the present invention;

FIG. 9C depicts a graphical interface for adding sources for resource transfers; and FIG. 10 depicts a process flow for conducting a resource transfer process through a persistent integration platform, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the resource transfer system is implemented. The entity may be a business organization, a non-profit organization, a government organization, and the like. In some embodiments, the entity may be a financial institution.

"User" as used herein may refer to an individual who may utilize the system to send digital resource requests. Typically, the user is authorized by the entity to access the system. Accordingly, the user may be a customer of an entity who owns an account within the entity's system. In other embodiments, the user may be a potential customer of the entity. In some embodiments, the user may be an employee, administrator, or representative of the entity.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing system may be a stationary unit such as a desktop computer or server. In some embodiments, the computing system may be a computer located on the entity's premises, such as a workstation, an ATM, a networked terminal, and the like.

"Account" as used herein may refer to a personalized record kept within an entity on behalf of a user. Each account is associated with a specific authorized user and contains information on resources owned by the user and held by the entity.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present invention provide a system, computer program product, and method for conducting a multichannel resource transfer. In particular, the system may utilize a multi-step and multilayered authentication process across multiple disparate computing systems to complete the resource transfer process. In some embodiments, the system may utilize a persistent element which may be accessed by the user across multiple devices which aids in the resource transfer. For instance, the resource transfer process may be started on a first computing system, which may be a stationary networked terminal. At this point, the system may authenticate the user using a first method. Once the user has been authenticated by the first method, a record of the resource transfer may be created within the persistent element. The record may contain, for example, data on the steps of the resource transfer which have already been completed by the user. The user may thereafter access the persistent element through a second computing system, such as a user device, to resume the resource transfer and complete the remaining steps as necessary.

In an exemplary embodiment, a user may enter authentication credentials at an ATM. The system may, via the ATM, provide the user an option to complete a resource transfer, such as a transfer of documents needed for a credit card application. Upon receiving a selection of the option by the user, the system may store a record of the selection within the persistent element, which may be a digital cart. The digital cart may store the steps of the application process that have been completed by the user at the ATM. Upon detecting that the user has left the ATM (e.g. by using location data, by detecting that the user has concluded transacting with the ATM, by using NFC technology, and the like), the ATM may push the digital cart to a number of computing systems associated with the user. In some embodiments, said computing system associated with the user may be a personal computing device such as a tablet, smartphone, laptop, desktop computer, and the like. In other embodiments, the computing system associated with the user may be a terminal within the entity's premises, such as a computer within a branch location operated by the entity. Through said computing system, the user may access the digital cart to complete the application process. When the user attempts to access the digital cart using said computing system, the system may request further authentication credentials from the user. In some embodiments, the further authentication credentials may be different from the authentication credentials requested by the ATM. Once the system has received the further authentication credentials, the system to the user an option to continue the application process. In this way, the system provides an expedient and secure way to transfer resources.

The system as disclosed herein offers a number of technological advantages over traditional methods of conducting resource transfers. Authenticating the user multiple times by using a multitude of authentication methods across the resource transfer process greatly increases the confidence level to which the user's identity is correctly verified by the system. Furthermore, allowing the resource transfer process to be resumed across disparate devices reduces the need to restart the resource transfer process from the beginning upon switching devices, thereby preventing the waste of various computing resources, which may include processing power, memory space, storage space, cache space, electric power, networking bandwidth, and the like.

FIG. 1 is a block diagram illustrating an operating environment, in accordance with one embodiment of the present invention. The operating environment may include a resource transfer server 100 in operative communication with a user computing system 110, an entity computing system 120, and a third party computing system 130 over a network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180.

The resource transfer server 100 comprises the hardware and software necessary to run the multichannel resource transfer system, which coordinates the resource transfer process amongst the user computing system 110, the entity computing system 120, and the third party computing system 130 through an API. Typically, the resource transfer server 100, the user computing system 110, the entity computing system 120, and the third party computing system 130 are owned and operated by an entity or a user. Accordingly, it should be understood by those of ordinary skill in the art that the various devices and computing systems as depicted herein may be embodied in a single device or computing system or multiple devices and/or computing systems operatively connected to one another in a distributed fashion. For instance, the resource transfer server 100 as depicted herein may be owned and operated by a first entity and comprise a series of computing systems acting in parallel to execute the functions of the resource transfer server 100. The resource transfer server 100 may contain a common digital platform that may be accessed from a plurality of different channels.

The entity computing system 120 may be a computer that is owned and operated by an entity. In an exemplary embodiment, the entity may be a financial institution and the entity computing system 120 may be an ATM. The entity computing system 120 may be configured to detect the identity of the user for authentication purposes. In some embodiments, the user may have an account with the entity or be a client of the entity. In such embodiments, the entity computing system 120 may query the resource transfer server 100 for information associated with the user. The entity computing system 120 may prompt the user to provide authentication credentials, such as login information, a PIN, password, and the like. The entity computing system 120 may further be configured to authenticate the user by biometric means, such as a retinal scan, facial recognition, and the like. Once the user has been authenticated, the entity computing system 120 may, based on the user's identity, prompt the user to conduct a resource transfer. In some embodiments, the resource transfer may be the provision of documents to the entity for a credit card application. The entity computing system 120, based on its communications with the resource transfer server 100, may preapprove the user for the credit card and present the offer to the user accordingly. In other embodiments, the user may be a potential client of the entity who has downloaded an application on the user computing system 110. In such embodiments, the entity computing system 120 may be configured to query the user computing system 110 for information associated with the user, which may be accomplished through the Internet, NFC, WiFi, Bluetooth, IR, and other similar communications technologies. In some embodiments, the user may wish to temporarily pause the credit card application process and finish it at a later time on a different device. In such embodiments, the entity computing system 120 may store the state of the application associated with the user within a persistent element, such as a digital cart. In some embodiments, the digital cart may be stored on the resource transfer server 100. In this way, the user is able to access the persistent cart on a different device to complete the application process. Typically, the user will complete the process on the user computing system 110. In other embodiments, the user may utilize a second entity computing system 120, such as a computer located on the entity's premises.

The user computing system 110 is typically owned and operated by a user. In some embodiments, the user computing system 110 may be a portable device such as a smartphone, tablet, PDA, smart device, laptop, and the like. The entity computing system 120 may detect the user computing system 110 is located in close proximity to the entity computing system 120, which may be accomplished by GPS, NFC, WiFi, and the like. The entity computing system 120 may then query the user computing system 110 to determine that an application provided by the entity is installed on the user computing system 110. If the user has begun the resource transfer process at the entity computing system 120 and has indicated that the user wishes to complete the process at a later time, the entity computing system 120 may be configured to push the data within the digital cart to the user computing system 110. Thereafter, the user may access the application provided by the entity on the user computing system 110, where the application may ask for further authentication credentials from the user. In some embodiments, the further authentication credentials may be different from the authentication credentials requested by the entity computing system 120, which may include voice recognition, fingerprint data, secure tokens, and the like. In this way, the user is provided with a convenient way to complete resource transfers, and the entity is provided with a higher degree of security and confidence that the user has been correctly identified.

The third party computing system 130 may be owned and operated by a second entity that is involved in the resource transfer process. The third party computing system 130 may contain information associated with the user. For instance, the third party computing system 130 may be owned and operated by a credit reporting agency which possess data on the user's credit history. In other embodiments, the third party computing system 130 may be owned and operated by real estate or automotive broker companies, from which the resource transfer server 100 scrapes data to provide targeted offers to the user.

FIG. 2 is a block diagram illustrating the resource transfer server 100, the user computing system 110, the entity computing system 120, and the third party computing system 130 in more detail, in accordance with one embodiment of the present invention. The resource transfer server 100 typically contains a processor 220 communicably coupled to such devices as a communication interface 210 and a memory 230. The processor 220, and other processors described herein, typically includes circuitry for implementing communication and/or logic functions of the multichannel resource transfer system. For example, the processor 220 may include a digital signal processor device, a microprocessor device, and various analog to digital converters, digital to analog converters, and/or other support circuits.

The resource transfer server 100 may use the communication interface 210 to communicate with other devices over the network 180. The communication interface 210 as used herein may include an Ethernet interface, an antenna coupled to a transceiver configured to operate on a cellular data or WiFi signal, and/or a near field communication ("NFC") interface.

The resource transfer server 100 may include a memory 230 operatively coupled to the processor 220. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. An entity server application 250 may be stored within the memory 230 of the resource transfer server 100. When executed, the entity server application 250 may securely communicate with the user computing system 110, entity computing system 120, and the third party computing system 130 and provide a common digital platform from which resource transfers may be started and resumed at any point and from any device to which the user has authenticated access. A historical database 240 may be stored within the memory 230, where the historical database 240 may include data associated with the interactions of the system with the user computing system 110, the entity computing system 120, and the third-party computing system 130. The memory 230 may store a data analytics engine, which reads the historical data within the historical database 240 to predict future actions taken by the user computing system 110 and/or the entity computing system 120 and provide recommendations to the user accordingly. Typically, the resource transfer server 100 is owned and/or operated by a first entity such as a financial institution which provides services to the various parties.

The user computing system 110 may comprise a communication interface 211, a processor 221, and a memory 231 having an entity user application 241 stored thereon. The entity user application 241 is typically an application provided by the entity to allow the user to access the resource transfer server 100 to begin, continue, and complete resource transfers regardless of which device was used to begin the process. As such, the user computing system 110 is owned and operated by the user, who is typically a client or potential client of the entity. The user computing system may further comprise a user interface 251 operatively coupled to the processor 221. The user interface 251 may comprise a number of input and output devices to interact with the user. Accordingly, the user interface 251 may comprise a number of input devices such as touchscreens, microphones, cameras, keyboards, keypads, motion sensors, and the like, and/or a number of output devices such as electronic displays, speakers, projectors, and the like. The user interface 251 may further comprise implements to receive authentication data from the user, such as biometric fingerprint readers, voice recognition software, facial recognition software, and the like.

The entity computing system 120 typically includes a processor 222 operatively coupled to a communication interface 212 and a memory 232. The memory 232 may contain an entity client application 242 which causes the processor 323 to interact with the user through the user interface 252, which may include various input devices and output devices as described above. The user interface 252 may further include various implements to authenticate the user, as described above. Typically, the entity computing system 120 is owned and/or operated by the first entity (i.e. the entity that owns and operates the resource transfer server 100) and is located on the entity's premises. The entity client application 242 may comprise the application code needed for the user 261 to access the entity server application 250. Typically, the user 261 completes at least a portion of a resource transfer at the entity computing system 120. In an exemplary embodiment, the entity computing system 120 may be an ATM, which may prompt the user 261 for authentication credentials, such as a PIN, password, voice command, biometric data, and the like. Once the user 261 has been authenticated, the system may query the historical database 240 within the resource transfer server 100 to determine an offer that is appropriate for the user 261. For instance, the system may determine that the user 261 is in the market to buy a house. The system may then, upon determining that the user 261 is eligible for a preapproved mortgage loan, offer to start the loan process at the ATM. Once the user accepts the offer, the application is stored to on the resource transfer server 100 within a persistent digital cart. The digital cart also tracks the status of the application, which may include the steps that have been completed and the steps remaining in the loan application process. In this way, the user 261 is able to resume the application on the user computing system 110 or another authorized device at a later time.

The third party computing system 130 typically includes a processor 223 operatively coupled to a communication interface 213 and a memory 233 having a third party database 243 stored thereon. Typically, the third party computing system 130 is owned and/or operated by a second entity, such as a broker or a credit reporting agency. The third party database 243 may store account data associated with the user. In an exemplary embodiment, the second entity may be a real estate listing agency which possesses data on potential properties that the user may be interested in purchasing. In such embodiments, the resource transfer server 100 may query the third party database 243 to retrieve said user-related data to tailor the mortgage loan offer accordingly.

The system as described above may include a number of additional features to facilitate resource transfers made by the user through the user computing system 110 and the entity computing system 120. These additional features will be discussed in turn as follows.

AI Optimized Discovery

FIG. 3 illustrates an implementation of artificial intelligence ("AI") optimized discovery, in accordance with one embodiment of the present invention. In this regard, a graphical interface 300 may be presented with the user through the user computing system. The user may, using the user computing system, interact with an AI bot stored on the resource transfer server through various channels (e.g., SMS, instant messaging, chat windows, audio conferences, or the like) to discover more information about the entity's products or services. In an exemplary embodiment, the user may send an SMS written in natural language to a number associated with the entity, such as a financial institution. The SMS may contain an indication that the user wishes to learn more about a particular service that may be offered by the entity. The system may respond to the user with additional prompts to tailor the system's response to be specific to the user's inquiry. The A may further be configured to gather data associated with the user and create specific recommendations. For instance, the AI may notify the user that the user may save a specific amount of money if the user chooses to refinance a loan with the entity.

Real-Time Triggers and Signaling

FIG. 4A, FIG. 4B, and FIG. 4C illustrate the real-time triggering and signaling functions of the system, in accordance with one embodiment of the present invention. In particular, FIG. 4A, FIG. 4B, and FIG. 4C illustrate graphical interfaces 400 for interacting with the real-time triggering functions. FIG. 4A shows a graphical interface 401 for an implementation of an events engine which tracks data associated with the user, such as life events, milestones, habits, search queries, and the like. The events engine, based on this data, may be able to instantaneously send resource transfer requests (e.g., offers for goods and/or services) to the user. In an exemplary embodiment, the user may have queried the AI of the resource transfer server regarding particular types of credit cards. The events engine may detect this activity and generate a signal to the system, which may then send an e-mail to an e-mail address associated with the user based on the signal. The e-mail may contain multiple offers that the system has determined may be of potential interest to the user.

FIG. 4B shows a graphical interface 402 for an implementation of the signaling functions of the system. In particular, data associated with the user may be used to trigger the signaling functions. Said data associated with the user may include the location of the user (e.g., as determined through a user's mobile device), the user's history of interactions with the system (e.g., search history, product or service inquiries, or the like), the user's account information, or the like. In an exemplary embodiment, the user may have indicated interest in purchasing a new vehicle to the entity. In situations in which the system has approved the user for a vehicle loan, the entity user application may detect that the user has arrived at the dealer's location and send a signal to the resource transfer server of the user's arrival. The system may then push data that is relevant to the location of the user (e.g., the relevant loan documents for purchasing a vehicle) to the user computing system through the entity user application to facilitate the purchase.

FIG. 4C shows a graphical interface 403 for further implementation of the signaling functions of the system, which may use historical data associated with a user to send notifications to the user. For instance, the user may have indicated interest in purchasing a home to a third party. In such embodiments, the resource transfer server may scrape data from third party computing systems to obtain behavioral data associated with the user. For instance, the system may scrape data from real estate listing services through which the user has selected a number of properties for a potential purchase. The system may then present to the user an offer to provide financing for the home purchase.

Persistent Digital Cart

FIG. 5A, FIG. 5B, FIG. 5C, FIG. 5D, and FIG. 5E show graphical interfaces 500 of implementations of the persistent element, in accordance with one embodiment of the present invention. Typically, the persistent element is a digital cart. FIG. 5A shows a graphical interface 501 with a clickable link within an interface that allows the user to add the offer to the persistent digital cart for resolution at a later time, potentially on a different device. FIG. 5B illustrates a graphical interface 502 which displays a "View cart" option once at least one item has been added to the digital cart. FIG. 5C shows a graphical interface 503 which allows the system to push reminders and/or notifications to the user to complete the items within the persistent digital cart if the items have remained within the persistent digital cart for a threshold amount of time. FIG. 5D illustrates a graphical interface 504 for the digital cart. In an exemplary embodiment, the user may wish to simultaneously apply for a checking account in addition to a credit card. To this end, the digital cart may offer suggestions to the user about products or services which may interest the user, which the system may determine based on its analytics engine, according to the user's preferences, behaviors, history with the entity, location, third party data, and the like. FIG. 5E shows graphical interface 505 for a digital cart which contains multiple items to be resolved by the user simultaneously. In this way, the system is able to reduce duplication of efforts in the application process, which in turn reduces the amount of computing resources needed to complete the applications for the two products.

Integrated Assistance Platform

FIG. 6A, FIG. 6B, FIG. 6C, and FIG. 6D illustrate graphical interfaces 600 for implementations of the integrated assistance platform, in one embodiment of the present invention. The resource transfer server may include a variety of functions which provide real-time assistance to the user while conducting resource transfers. For example, FIG. 6A illustrates a graphical interface 601 for an implementation in which the system detects that the user has arrived at a particular location for an appointment, such as an appointment to meet with an entity's representative. The system may detect the location of the user based on the user's mobile device (e.g. by GPS, WiFi, NFC, and the like), and automatically check the user into the appointment when the user is detected as being located on the entity's premises. FIG. 6B illustrates a graphical interface 602 for an embodiment in which the system automatically pushes a survey to the user's computing system upon detecting that the user has left the entity's premises. FIG. 6C illustrates a graphical interface 603 for a feature of the entity user application which allows the user to engage in a video conferencing session with an entity representative. FIG. 6D shows a graphical interface for an implementation in which the user is able to interact with the AI to receive instantaneous support. In an exemplary embodiment, the user may have a specific question about the process of applying for a credit card. The user may send an SMS to the AI through a designated number with the question written in natural prose. The AI may then recognize the keywords in the query, conduct a search of one or more support databases, and respond according to the data retrieved from the one or more support databases.

1-Click Functionality

FIG. 7A, FIG. 7B, FIG. 7C, and FIG. 7D illustrate graphical interfaces 700 for implementations of the 1-click functions of the system, in accordance with one embodiment of the present invention. FIG. 7A illustrates an interface 701 which has been used to provide an offer to the user. In an exemplary embodiment, the system may notify a user that the user has been pre-qualified for a loan. FIG. 7B illustrates an interface 702 which shows the capability of the system to pre-fill applications to complete the offer (e.g., the loan application) with the user's information. The user's information may be stored, for instance, within the databases of the resource transfer server. In other embodiments, as can be seen in the interface 703 of FIG. 7C, the user's information may be pulled from a plurality of third party servers and cross-referenced to ensure accuracy. The system may prompt the user to authorize the system to request the user's information from the various third parties. FIG. 7D shows an interface 704 illustrating the ability of the system to pull the user's information through an API linked with the user's computing system. For example, the system may access the user's information stored on the user's mobile device, such as a smartphone, to aid in pre-filling the fields to expedite the application process. Prefilling known information in this manner prevents the unnecessary steps of requesting the information from the user, which prevents the duplication of data and thus further improves the efficiency of the system.

Multi-Channel Support

FIG. 8A and FIG. 8B show graphical interfaces 800 for implementations of the multi-channel support features provided by the system and persistent digital cart. FIG. 8A shows an interface 800 that allows a user to access an application stored within the persistent digital cart. The interface may show the overall status of the application as well as offer functions that allow the user to save the application for completion at a later time and/or on a different device. FIG. 8B shows an interface 802 comprising a push notification that may be sent by the system to remind the user that an application is pending within the digital cart.

Third-Party Platform Integration for Account Setup

FIG. 9A, FIG. 9B, and FIG. 9C illustrate graphical interfaces 900 for implementations of system aids for user account setup, in accordance with one embodiment of the present invention. FIG. 9A shows an interface 901 that allows for easy digital enrollment of account management by the user. FIG. 9B illustrates an interface 902 showing a function of the system that allows for the importation of third party data that allows the user to seamlessly manage resource transfers from multiple platforms within a single application. In an exemplary embodiment, the system may interact with third party servers to retrieve third party account information associated with the user (e.g., outstanding bills for which the user is responsible). The interface 902 may display the third party accounts retrieved from the third party server to allow the user to select which third party accounts, if any, the user wishes to import into the user account with the entity. FIG. 9C illustrates an interface 903 that allows the user to easily add funding sources to a digital wallet.

FIG. 10 illustrates a process flow for conducting a resource transfer process through the persistent integration platform, in accordance with one embodiment of the present invention. The process begins at block 1000, where the system detects that the user has accessed the entity computing system. In an exemplary embodiment, the user may be conducting a transaction at an ATM. In some embodiments, the user may have provided input to the ATM, such as by touching the touchscreen or keypad/keyboard inputs. In other embodiments, the user may have triggered a motion sensor, camera, or microphone that detects the user's presence. In yet other embodiments, the ATM may detect the presence of the user by detecting a mobile device carried by the user, such as through GPS collocation, NFC, WiFi, and other technologies.

The process continues to block 1001, where the system authenticates the user using a first authentication method. At this step, the system may attempt to determine the identity of the user, which may include whether the user is a customer of the entity. Accordingly, the ATM may request authentication credentials from the user, which may include a PIN, password, voice command, biometric fingerprint data, and the like. The ATM may further gather authentication data through means such as facial recognition, a secured token on the user's mobile device, scanning the user's identification card, and the like. Once the user has been authenticated and/or identified, the system may detect that the user is a client of the entity.

The process continues to block 1002, where the system retrieves from the resource transfer server, over a network, data associated with the user. Typically, the user is a client of the entity. In this scenario, the system has direct access to the client's information, such as account data, biographical information, spending habits, behaviors, and the like. The system may retrieve such data from the entity's servers to provide a more streamlined experience to the user when conducting resource transfers. In other embodiments, the system may detect that the user is not a client of the entity. In such a scenario, the system may retrieve data associated with the user from one or more third party servers, which may include real estate or vehicle listing services, credit reporting agencies, and the like.

The process continues to block 1003, where the system, based on the data associated with the user, prompts the user to initiate a resource transfer process. In an exemplary embodiment, the resource transfer process may be a transfer of necessary information from the user to the system in order to complete a credit card application. The user may, based on the information provided by the user and retrieved from the entity's servers and/or third party servers, make recommendations for products and/or services offered by the entity that may be of interest to the user. The prompt/offer may be presented to the user through an output device within or connected to the ATM, such as an illuminated display. The user may then be able to provide input to accept or reject the offer, such as by touchpad, keypad, voice commands, and the like. If the user accepts the offer, the ATM may initiate the application process by pre-filling certain required information based on the user's input as well as data retrieved from the entity's servers and/or third party servers.

The process continues to block 1004, where the system detects that the user wishes to suspend the transfer process. In some circumstances, the application process may require additional information or documents that the user may not be able to provide in a timely manner when conducting transactions at the ATM. Accordingly, the ATM may display an option to the user to save the application for completion at a later time. In other embodiments, the ATM may, based on the nature of the application, automatically save the application for completion at a later time by pushing the application to the user's mobile computing system.

The process continues to block 1005, where the system generates a data record of the resource transfer process within the persistent element of the resource transfer server. Typically, the persistent element is a digital cart stored within the entity's servers. The data record within the digital cart may be pushed to the user's mobile device for completion of the application at a later time. This digital cart creates a persistent integration platform which allows the user to complete the application on a multitude of disparate devices and channels; because the digital cart is accessible centrally, the user need not at any point restart any portion of the application process, which prevents the waste of computing resources associated with the duplication of steps in the application.

The process continues to block 1006, where the system detects that the user wishes to resume the transfer process using a user computing system. In some embodiments, the user computing system may be a mobile device such as a smartphone or tablet. In other embodiments, the user computing system may be a device such as a desktop or laptop computer. The system may detect that the user has attempted to access the entity's servers using the user computing system. In some embodiments, the user may have attempted to resume the process through a third party application such as a web browser. In other embodiments, the user may attempt to resume the application process via the entity user application provided by the entity.

The process concludes at block 1007, where the system authenticates the user using a second authentication method. Typically, the system will require the user to provide authentication credentials in addition to the credentials provided by the user when initiating the resource transfer. For instance, if the user provided a PIN at the ATM, the user may be required to provide a password or biometric thumbprint to resume the application process. As another example, if the user has provided a password at the ATM, the user may be prompted to provide facial recognition data, secured tokens, and the like. In this way, the system is able to significantly increase the confidence level to which the system is able to correctly identify the user. This greatly increases the security of the resource transfer system and reduces the incidence of wasted computing resources associated with correcting incorrect identifications.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| To be assigned | MULTI-LEVEL AUTHENTICATION SYSTEM WITH PERSISTENT INTEGRATION PLATFORM | Concurrently herewith |

What is claimed is:

1. A system for a persistent integration platform for multi-channel resource transfers, the system comprising:
a communication interface;
a processor; and
a memory having executable code stored thereon, wherein the executable code, when executed by the processor, causes the processor to:
detect that a user has accessed an entity computing system by the user providing at least one of a touchscreen or keypad input to the entity computing system;
detect, by the entity computing system using near field communication ("NFC"), that a mobile device associated with the user is in close proximity with the entity computing system;
authenticate the user via the entity computing system using a first authentication method, wherein the first authentication method comprises receiving a secured token from the mobile device associated with the user;
retrieve, from a resource transfer server, data associated with the user;
based on the data associated with the user, prompt the user to initiate a resource transfer process;
detect that the user wishes to suspend the resource transfer process;
generate a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
detect that the user wishes to resume the resource transfer process via a user computing system;
authenticate the user via the user computing system using a second authentication method, wherein the second authentication method is different from the first authentication method;
resume, on the user computing system, the resource transfer process based on the steps remaining in the resource transfer process;
detect, from the mobile device associated with the user, a location of the user;
based on detecting the location of the user, detect that the user has arrived at a first location;
trigger, in real-time, transmission of a signal a signal to a resource transfer server associated with a second resource transfer process, wherein the signal indicates that the user has arrived at the first location;
instantaneously push data associated with the second resource transfer process to the mobile device associated with the user; and
based on the location of the user and historical data associated with the user, prompt the user to initiate the second resource transfer process on a display of the mobile device associated with the user.

2. The system of claim 1, wherein the executable code further causes the processor to:
receive a request from the user to initiate the second resource transfer process; and
generate a second data record of the second resource transfer process within the persistent element.

3. The system of claim 1, wherein the executable code further causes the processor to:
receive a request from the user to access an artificial intelligence bot stored on the resource transfer server, wherein the request comprises an inquiry from the user; and
based on the inquiry from the user and the data associated with the user, transmit a recommendation to the user.

4. The system of claim 1, wherein the executable code further causes the processor to:
detect that the data record of the resource transfer process has remained within the persistent element for a threshold amount of time; and
send a notification to the user, where the notification comprises a reminder to complete the resource transfer process.

5. The system of claim 1, wherein the executable code further causes the processor to:
detect that the resource transfer process requires personal information of the user;
retrieve the personal information of the user from the data associated with the user; and
using the personal information of the user, complete the resource transfer process.

6. The system of claim 5, wherein retrieving the personal information of the user comprises pulling the personal information from a third party database.

7. The system of claim 5, wherein retrieving the personal information of the user comprises pulling the personal information from the user computing system through an API.

8. The system of claim 1, wherein the executable code further causes the processor to:
receive, from the user, a request to import a third party account associated with the user;
retrieve, from a third party server, third party account information associated with the user; and
prompt the user to select the third party account for importing.

9. A computer program product for a persistent integration platform for multi-channel resource transfers, the computer program product comprising at least one non-transitory computer readable medium having computer-readable program code portions embodied therein, the computer-readable program code portions comprising:
an executable portion for detecting that a user has accessed an entity computing system by the user providing at least one of a touchscreen or keypad input to the entity computing system;
an executable portion for detecting, by the entity computing system using near field communication ("NFC"), that a mobile device associated with the user is in close proximity with the entity computing system;
an executable portion for authenticating the user via the entity computing system using a first authentication method, wherein the first authentication method comprises receiving a secured token from the mobile device associated with the user;
an executable portion for retrieving, from a resource transfer server, data associated with the user;
an executable portion for, based on the data associated with the user, prompting the user to initiate a resource transfer process;
an executable portion for detecting that the user wishes to suspend the resource transfer process;
an executable portion for generating a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
an executable portion for detecting that the user wishes to resume the resource transfer process via a user computing system;
an executable portion for authenticating the user via the user computing system using a second authentication method, wherein the second authentication method is different from the first authentication method;
an executable portion for resuming, on the user computing system, the resource transfer process based on the steps remaining in the resource transfer process;
an executable portion for detecting, from the mobile device associated with the user, a location of the user;
an executable portion for, based on detecting the location of the user, detecting that the user has arrived at a first location;
an executable portion for triggering, in real-time, transmission of a signal to a resource transfer server associated with a second resource transfer process, wherein the signal indicates that the user has arrived at the first location;
an executable portion for instantaneously pushing data associated with the second resource transfer process to the mobile device associated with the user; and
an executable portion for, based on the location of the user and historical data associated with the user, prompting the user to initiate the second resource transfer process on a display of the mobile device associated with the user.

10. The computer program product of claim 9, the computer-readable program code portions further comprising:
an executable portion for receiving the request from the user to initiate a second resource transfer process; and
an executable portion for generating a second data record of the second resource transfer process within the persistent element.

11. The computer program product of claim 9, the computer-readable program code portions further comprising:
an executable portion for receiving a request from the user to access an artificial intelligence bot stored on the resource transfer server, wherein the request comprises an inquiry from the user; and
an executable portion for based on the inquiry from the user and the data associated with the user, transmitting a recommendation to the user.

12. The computer program product of claim 9, the computer-readable program code portions further comprising:
an executable portion for detecting that the data record of the resource transfer process has remained within the persistent element for a threshold amount of time; and
an executable portion for sending a notification to the user, where the notification comprises a reminder to complete the resource transfer process.

13. A computer-implemented method for a persistent integration platform for multi-channel resource transfers, the method comprising:
detecting that a user has accessed an entity computing system by the user providing at least one of a touchscreen or keypad input to the entity computing system;
detecting, by the entity computing system using near field communication ("NFC"), that a mobile device associated with the user is in close proximity with the entity computing system;
authenticating the user via the entity computing system using a first authentication method, wherein the first authentication method comprises receiving a secured token from the mobile device associated with the user;
retrieving, from a resource transfer server, data associated with the user;
based on the data associated with the user, prompting the user to initiate a resource transfer process;
detecting that the user wishes to suspend the resource transfer process;
generating a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
detecting that the user wishes to resume the resource transfer process via a user computing system;
authenticating the user via the user computing system using a second authentication method, wherein the second authentication method is different from the first authentication method;
resuming, on the user computing system, the resource transfer process based on the steps remaining in the resource transfer process;
detecting, from the mobile device associated with the user, a location of the user;
based on detecting the location of the user, detecting that the user has arrived at a first location;

triggering, in real-time, transmission of a signal to a resource transfer server associated with a second resource transfer process, wherein the signal indicates that the user has arrived at the first location;

instantaneously pushing data associated with the second resource transfer process to the mobile device associated with the user; and based on the location of the user and historical data associated with the user, prompting the user to initiate the second resource transfer process on a display of the mobile device associated with the user.

14. The computer-implemented method of claim 13, further comprising:

receiving a request from the user to initiate the second resource transfer process; and generating a second data record of the second resource transfer process within the persistent element.

15. The computer-implemented method of claim 13, further comprising:

receiving a request from the user to access an artificial intelligence bot stored on the resource transfer server, wherein the request comprises an inquiry from the user; and based on the inquiry from the user and the data associated with the user, transmitting a recommendation to the user.

16. The computer-implemented method of claim 13, further comprising:

detecting that the data record of the resource transfer process has remained within the persistent element for a threshold amount of time; and sending a notification to the user, where the notification comprises a reminder to complete the resource transfer process.

17. The computer-implemented method of claim 13, further comprising:

detecting that the resource transfer process requires personal information of the user;

retrieving the personal information of the user from the data associated with the user; and using the personal information of the user, completing the resource transfer process.

18. The computer-implemented method of claim 17, wherein retrieving the personal information of the user comprises pulling the personal information from a third party database.

19. The computer-implemented method of claim 17, wherein retrieving the personal information of the user comprises pulling the personal information from the user computing system through an API.

20. The computer-implemented method of claim 13, further comprising:

receiving, from the user, a request to import a third party account associated with the user;

retrieving, from a third party server, third party account information associated with the user; and prompting the user to select the third party account for importing.

* * * * *